US008843786B2

(12) United States Patent
Jibbe et al.

(10) Patent No.: US 8,843,786 B2
(45) Date of Patent: *Sep. 23, 2014

(54) SYSTEM FOR INJECTING PROTOCOL SPECIFIC ERRORS DURING THE CERTIFICATION OF COMPONENTS IN A STORAGE AREA NETWORK

(71) Applicant: LSI Corporation, San Jose, CA (US)

(72) Inventors: Mahmoud K. Jibbe, Wichita, KS (US); Prakash Palanisamy, Tamil Nadu (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 13/910,319

(22) Filed: Jun. 5, 2013

(65) Prior Publication Data

US 2014/0013152 A1 Jan. 9, 2014

Related U.S. Application Data

(63) Continuation of application No. 12/983,996, filed on Jan. 4, 2011, now Pat. No. 8,489,935, which is a continuation of application No. PCT/US2008/009972, filed on Aug. 21, 2008.

(60) Provisional application No. 61/080,806, filed on Jul. 15, 2008.

(51) Int. Cl.
*G06F 11/00* (2006.01)
*H04L 12/26* (2006.01)
*G06F 11/10* (2006.01)

(52) U.S. Cl.
CPC ........ *G06F 11/1076* (2013.01); *H04L 12/2697* (2013.01); *H04L 43/50* (2013.01)
USPC ................................ 714/41; 714/4.1; 714/25

(58) Field of Classification Search
USPC ............ 714/4.1, 4.5, 25, 35, 37, 41, 43, 47.1, 714/56
See application file for complete search history.

(56) References Cited

U.S. PATENT DOCUMENTS

| 5,574,855 | A | 11/1996 | Rosich et al. | ............. 395/183.17 |
| 5,819,071 | A | 10/1998 | Mazer | ............................ 395/500 |
| 6,233,073 | B1 * | 5/2001 | Bowers et al. | .................. 398/16 |

(Continued)

FOREIGN PATENT DOCUMENTS

| CN | 1703016 A | 11/2005 | |
| CN | 1708742 A | 12/2005 | |
| JP | 06-214823 | 5/1994 | .............. G06F 11/22 |
| JP | 10-301861 | 11/1998 | .............. G06F 13/00 |
| JP | 2003-044369 | 2/2003 | .............. G06F 13/00 |
| JP | 2003-044420 | 2/2003 | .............. G06F 13/10 |
| JP | 2006-235665 | 9/2006 | .............. G06F 13/00 |
| WO | WO2004/096802 A2 | 11/2004 | ........... C07D 471/04 |
| WO | WO 2004/097576 A2 | 11/2004 | ........... C07D 471/04 |

OTHER PUBLICATIONS

He, Xubin, et al., "SPEK: A Storage Performance Evaluation Kernel Module for Block-Level Storage Systems Under Faulty Conditions", IEEE Transactions on Dependable and Secure Computing, vol. 2, No. 2, Apr.-Jun. 2005, pp. 138-149.

*Primary Examiner* — Joseph D Manoskey
(74) *Attorney, Agent, or Firm* — Christopher P. Maiorana, PC

(57) ABSTRACT

An apparatus comprising an initiator circuit and a target circuit. The initiator circuit may be configured to (i) communicate with a network through a first interface and (ii) generate testing sequences to be sent to the network. The target circuit may be configured to (i) receive the testing sequences from the network through a second network interface and (ii) respond to the testing sequences.

20 Claims, 3 Drawing Sheets

(56) References Cited

U.S. PATENT DOCUMENTS

| | | | |
|---|---|---|---|
| 6,304,984 B1 * | 10/2001 | Neal et al. | 714/57 |
| 6,490,544 B1 | 12/2002 | Diamond et al. | 702/186 |
| 7,620,851 B1 | 11/2009 | Leavy et al. | 714/41 |
| 7,890,810 B1 | 2/2011 | Coatney et al. | 714/41 |
| 2003/0056153 A1 | 3/2003 | Beer et al. | 714/43 |
| 2005/0028044 A1 | 2/2005 | Paulsen et al. | 714/43 |
| 2006/0020586 A1 | 1/2006 | Prompt et al. | 707/3 |
| 2007/0206496 A1 | 9/2007 | Roy et al. | 370/229 |
| 2007/0208977 A1 | 9/2007 | Clark et al. | 714/728 |
| 2007/0220176 A1 | 9/2007 | Henning et al. | 710/1 |
| 2007/0271082 A1 | 11/2007 | Dominguez et al. | 703/20 |

* cited by examiner

SYSTEM FOR INJECTING PROTOCOL SPECIFIC ERRORS DURING THE CERTIFICATION OF COMPONENTS IN A STORAGE AREA NETWORK

This application relates to U.S. Ser. No. 12/983,996, filed Jan. 4, 2011, which is a continuation of International Application PCT/US2008/009972, with an International Filing Date of Aug. 21, 2008, which claims the benefit of U.S. Provisional Application No. 61/080,806, filed Jul. 15, 2008, each of which is incorporated by reference in their entirety.

FIELD OF THE INVENTION

The present invention relates to storage arrays generally and, more particularly, to a method and/or apparatus for implementing a system for the injection of protocol specific errors used during the certification of components in a storage area network.

BACKGROUND OF THE INVENTION

Conventional drive arrays do not offer tools that can inject errors in an Internet Small Computer System Interface (iSCSI) protocol format. Some tools are available for other protocols, such as Fibre Channel. However, a Fibre Channel tool needs a separate analyzer, which can be expensive.

Such an analyzer is placed between an initiator and a target device. Using the analyzer, the Protocol Data Unit (PDU) sent from the initiator to the target will be intercepted. Some bits in the PDU stack will be modified to introduce errors in the response. One conventional approach for error injection uses a Finisar Xgig protocol analyzer (available from Finisar Corporation of Sunnyvale Calif.) between the initiator and target connectivity.

Disadvantages with such an error injection system include (i) extra cost involved in the Finisar Analyzer, (ii) the need for a protocol expert to locate the required bit and to vary the bit, (iii) the extra space and/or cabling needed, (iv) the inability to operate on a remote setup, (v) the need for an extra PC/Laptop to monitor and modify the Analyzer, and/or (vi) the need for tapping the data to modify and resend it may cause some delay in transmission. Even with such a hardware device, a user is not able to inject iSCSI errors. Such a device is not able to provide iSCSI jammer functions.

It would be desirable to implement a system for injecting protocol specific errors (e.g., iSCSI) during the certification of an iSCSI components in a storage area network.

SUMMARY OF THE INVENTION

The present invention concerns an apparatus comprising an initiator circuit and a target circuit. The initiator circuit may be configured to (i) communicate with a network through a first interface and (ii) generate testing sequences to be sent to the network. The target circuit may be configured to (i) receive the testing sequences from the network through a second network interface and (ii) respond to the testing sequences.

The objects, features and advantages of the present invention include providing a test system that may (i) inject errors in a PDU, (ii) be implemented without a dedicated hardware device, (iii) be implemented without a protocol expert to monitor the traffic, (iv) be implemented without a separate PC/Laptop for monitoring and modifying the PDU response, (v) be implemented without tapping the network traffic, (vi) avoid delays, (vii) automate the testing process, (viii) provide an easy to use system even if the test is executed manually, (ix) be implemented in software, (x) allow efficient feature and enhancement upgrades through software, (xi) provide design and debugging flexibility, and/or (xii) allow modification of a fault injection to stay compatible with future protocol releases and/or versions without the cost of updating hardware.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The certification of an internet Small Computer System Interface (iSCSI) array controller uses tools which allow the injection of protocol. The invention concerns the introduction (or injection) of protocol specific errors in a PDU directly from within an existing component, such as an initiator. In one example, the present invention may be implemented as a software module implemented within such an existing component. The errors may be used to validate whether a target, such as an array controller, responds and recovers properly from infected erroneous data inputs. Such responses may be implemented without causing one or more of the following (i) unexpected/unaccepted errors, (ii) data corruption, (iii) loss of access to data, (iv) I/O Errors, (v) I/O timeouts, (vi) array controller hang ups and/or (vi) other errors.

The present invention may provide a system for injecting errors in a Protocol Data Unit (PDU) that may be performed at the PDU generation stage. The present invention may avoid tapping the data between transmissions and/or may avoid modifying the data. By using a software initiator, the protocol specific errors may be injected in the PDUs while the PDUs are being generated.

Figure 1:
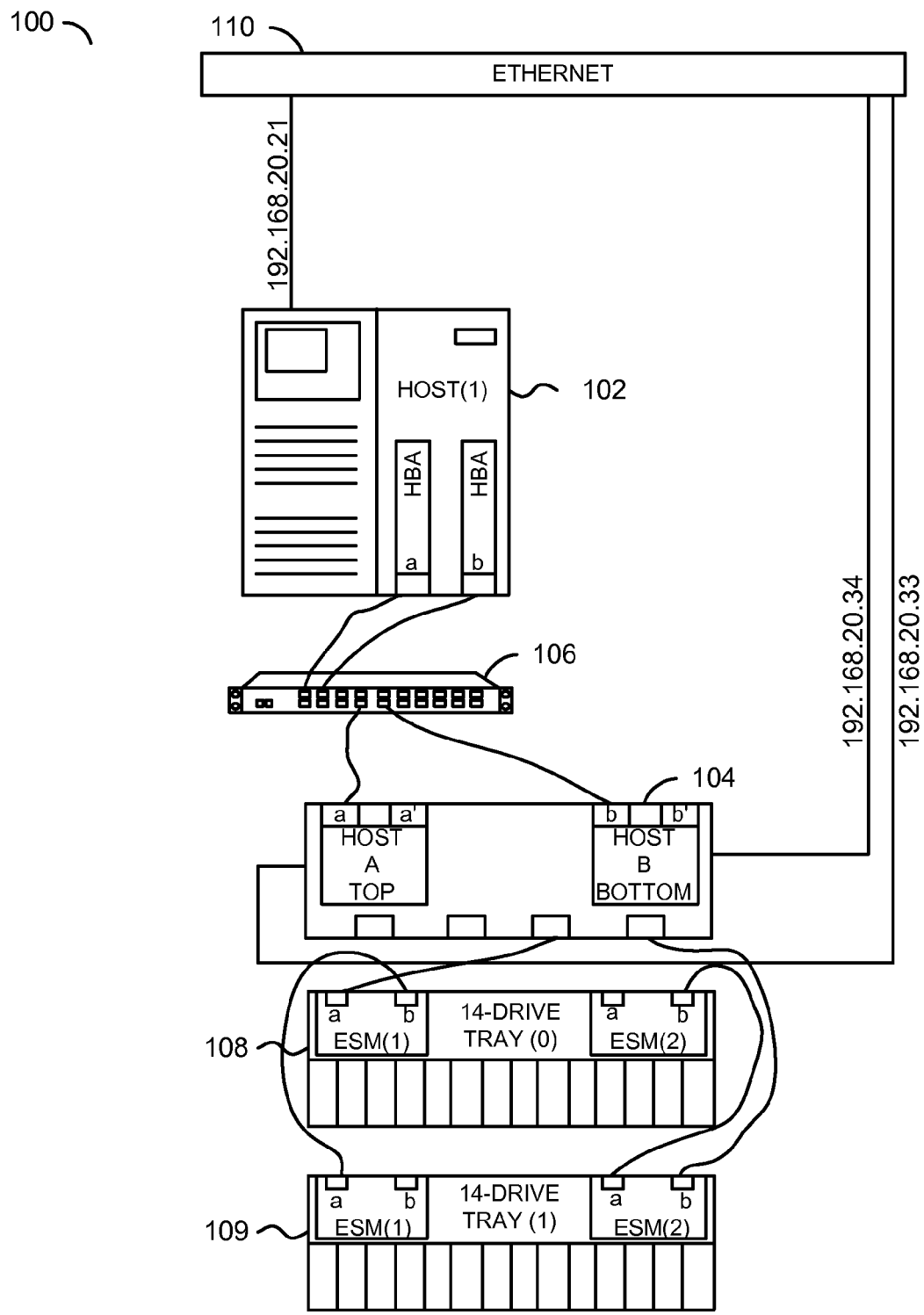
FIG. 1 is a diagram illustrating the present invention.

Referring to FIG. 1, a block diagram of a system 100 is shown in accordance with a preferred embodiment of the present invention. The system 100 illustrates error injection during generation of PDU. The system 100 generally comprises a block (or circuit) 102, a block (or circuit) 104, a block (or circuit) 106, a block (or circuit) 108, a block (or circuit) 109 and a network 110. The circuit 102 may be implemented as an initiator circuit. The circuit 104 may be implemented as a host circuit. The circuit 106 may be implemented as a network device, such as a hub, regulator, switch, etc. In one example, the circuit 106 may be implemented as a fibre channel switch. An example of such a switch may be found in co-pending application Ser. No. 61/080,762, Filed Jul. 15, 2008, which is incorporated by reference in its entirety. In one example, the circuit 108 may be implemented as a storage (or drive) enclosure. In one example, the circuit 109 may be implemented as a storage (or drive) enclosure. The network 110 may be implemented as an Ethernet network.

The circuit 102 is shown connected to the network 110 through an IP connection (e.g., 192.168.20.21). The particular IP address may be varied for the particular network environment. Similarly, the device 104 is shown having an IP connection (e.g., 192.168.20.34) and an IP connection (e.g., 192.168.20.33). The IP address 33 and the IP address 34 may provide a multi-path connection from the device 104 to the network 110. The device 104 may also connect to the network 110 through the switch 106 and the circuit 102.

In one example, the system 100 may use an iSCSI software initiator 102. However, other protocol specific initiators may be implemented to meet the design criteria of a particular implementation. In an iSCSI environment, a /PROC virtual file system may be implemented to inject error during PDU generation. The "/" generally indicates a directory structure and the "PROC" generally indicates a directory name. The particular name may be varied to meet the design criteria of a particular implementation. In one example, such a virtual file system may be implemented in a Linux operation system. However, other operating systems may be implemented to meet the design criteria of a particular implementation. By modifying the values in the PROC file system, which the iSCSI initiator 102 uses while generating PDU, the system 100 may inject one or more errors into the PROC file system. The errors may be controlled in a manner useful for testing the way a particular network environment reacts to actual errors. The controlled errors may be used for testing prior to setting the network to a "live" state. The PDU transmission may be logged in the host circuit 104 which may be used for further analysis.

The complete testing using error injection may be automated using a shell/expect script. Automation of such scripts may contain details such as (i) Internet Protocol (IP) address of Initiator and Target, (ii) Port Number for communication [e.g., default 3260], (iii) Logon credentials (if needed), and/or (iv) values to be varied in PROC entry etc.

System specifications may include (i) Linux machine with 2.6 kernel as the initiator host 104, (ii) development packages installed in the host 104, (iii) a software initiator with error injection module, (iv) a NIC (Network Interface Card) port to connect to the initiator 102, (v) support for shell/expect script, and/or (vi) if a firewall is present, communication through the specified port should be enabled.

Figure 2:
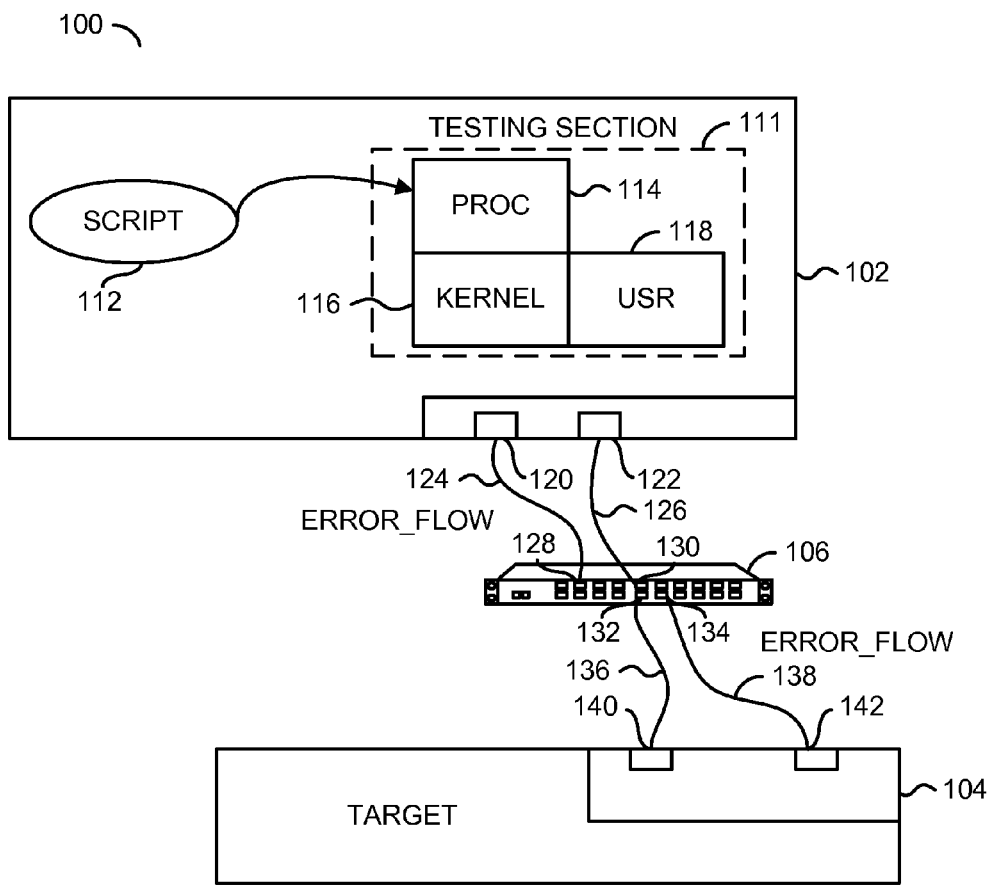
FIG. 2 is a more detailed diagram of the present invention.

Referring to FIG. 2, a more detailed diagram of the initiator target 100 is shown. The initiator 102 generally comprises a block (or circuit) 111 and a block (or circuit) 112. The circuit 111 may be implemented as a testing section (or circuit). The circuit 111 generally comprises a block (or circuit) 114, a block (or circuit) 116 and a block (or circuit) 118. The circuit 112 may be implemented as a script circuit. The circuit 114 may be implemented as a PROC circuit. The circuit 116 may be implemented as a kernel circuit. The circuit 118 may be implemented as a user circuit.

The initiator 102 may have an input/output 120 and an input/output 122. The inputs/outputs 120 and 122 may generate a signal ERROR_FLOW. The protocol specific errors generated by the initiator 102 may be included in the signal ERROR_FLOW. The signal ERROR_FLOW may be presented (or connected) from input/output 120 to the input/output 128. The signal ERROR_FLOW may also be presented (or connected) from input/output 122 to the input/output 130. The input/output 120 may be connected to the input/output 128 by a network cable 124. The input/output 122 may be connected to the input/output 122 by the network cable 126. In one example, the network cable 124 and the network cable 126 may be implemented as Fibre channel cables (or links). However, other types of links may be implemented to meet the design criteria of a particular implementation.

The host circuit 104 generally comprises an input/output 140 and an input/output 142. The signal ERROR_FLOW may be presented (or connected) from the input/output 132 to the input/output 140. The signal ERROR_FLOW may be presented (or connected) from the input/output 134 to the input/output 142. The input/output 132 may be connected to the input/output 140 by a network cable 136. The input/output 134 may be connected to the input/output 142 by the network cable 138. In one example, the network cable 136 and the network cable 138 may be implemented as Fibre channel cables (or links). However, other types of links may be implemented to meet the design criteria of a particular implementation.

Figure 3:
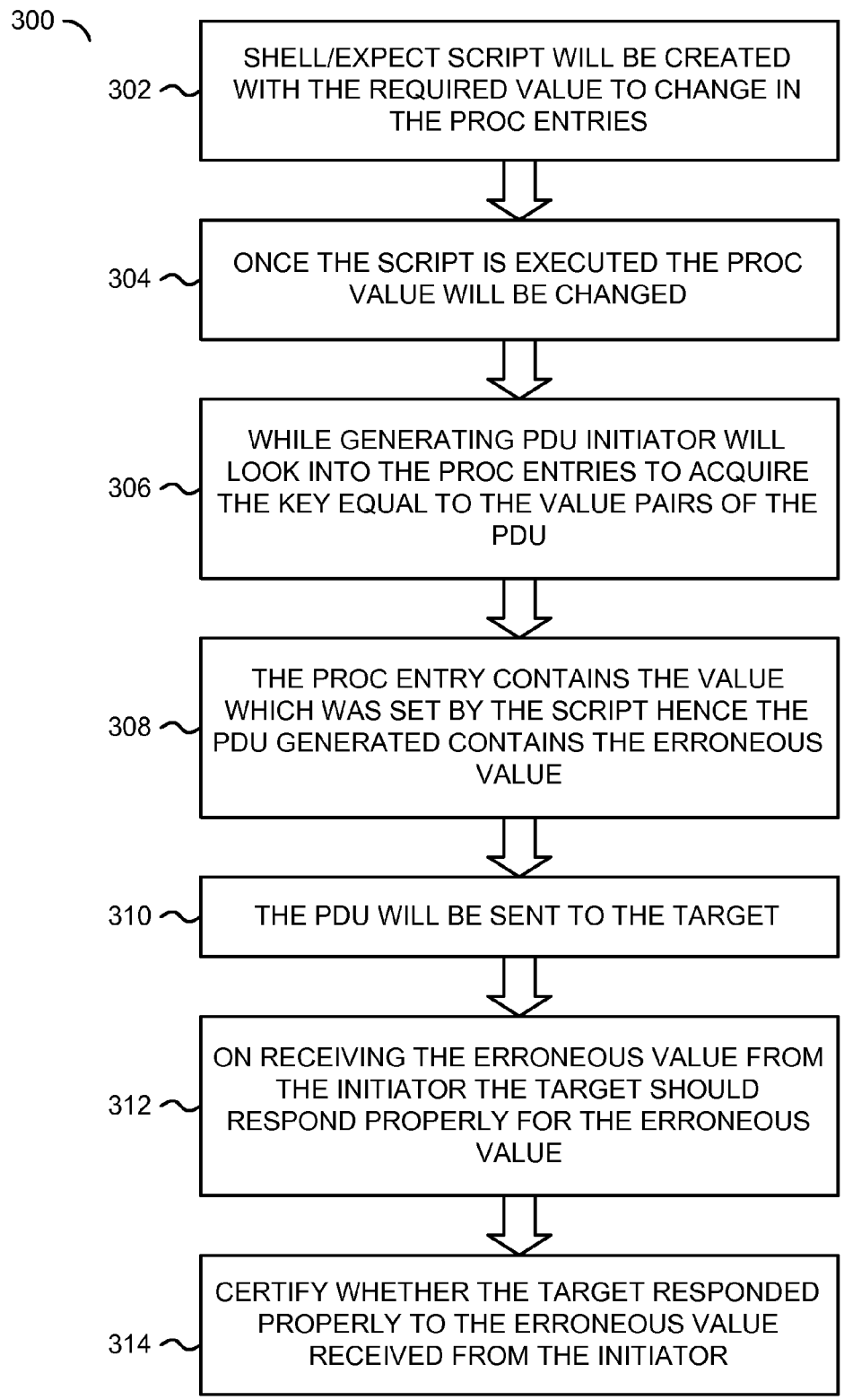
FIG. 3 is a flow diagram of the present invention.

Referring to FIG. 3, a flow diagram 300 is shown. The flow diagram 300 generally comprises a step (or state) 302, a step (or state) 304, a step (or state) 306, a step (or state) 308, a step (or state) 310, a step (or state) 312 and a step (or state) 314. The step 302 provides a shell/expect script that would be created with the required value to change in the PROC entries. The state 304 determines that once the script is executed the PROC value will be changed. The step 306 determines that while generating PDU, the initiator 102 will look into the PROC entries to acquire the key equal to the value pairs of the PDU. The step 308 determines that the PROC entry contains the value which was set by the script, hence the PDU generated contains the erroneous value. The step 310 determines that the PDU will be sent to the target 104. The step 312 determines that upon receiving the erroneous value from the initiator 102 the target 104 should respond properly for the erroneous value. The step 314 determines when to certify whether the target 104 responded properly for the erroneous value received from the initiator 102. The iSCSI services are normally started in both the initiator 102 and target 104.

The system 100 may inject errors in the PDU response without tapping the original communication. Various values PROC entries may be charged. For example, "Active Version Change, CHAP (Challenge Handshake Authentication Protocol) A, CHAP C Length, Delay PDU response, Drop PDU, Drop Connection, Inject Digest Error, under run, over run, CRC error, reset, etc." The system 100 may be used to provide error injection even on a remote setup using the switch 106.

The present invention may be extended to inject errors in software target 104 which enables testing of the initiator 102. Such an implementation may simulate erroneous conditions at initiator 102, by modifying the PDU values to obtain the expected result. The present invention may work with any device capable of sending iSCSI request PDUs and receiving iSCSI response PDUs. The present invention may be expanded to inject errors in a target for testing the initiator 102. The present invention may be implemented with any iSCSI target devices (e.g., iSCSI Controllers, key iSCSI software targets, etc.) that need to be tested. Other protocols (e.g., other than iSCSI) may also be implemented.

The function performed by the software module of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:
an initiator circuit configured to (i) communicate with a network, (ii) generate a plurality of testing sequences from a plurality of values stored in a file, (iii) create one or more errors in said testing sequences by altering said file and (iv) transmit said file including said testing sequences on said network; and
a target circuit configured to (i) receive said file including said testing sequences from said network, (ii) generate a plurality of responses to said testing sequences and (iii) transmit said responses on said network to said initiator circuit, wherein said initiator circuit is further configured to verify that said target properly responded to said errors in said testing sequences.

2. The apparatus according to claim 1, wherein said target circuit comprises a RAID controller.

3. The apparatus according to claim 1, wherein said initiator circuit comprises a testing section configured to (i) generate said testing sequences in a first state and (ii) generate error-free sequences from said values in a second state.

4. The apparatus according to claim 1, wherein said errors introduced in said testing sequences comprise protocol specific error sequences configured to simulate protocol specific errors.

5. The apparatus according to claim 4, wherein said protocol specific errors simulate errors in a network environment.

6. The apparatus according to claim 5, wherein said network environment comprises a fibre channel network.

7. The apparatus according to claim 4, wherein said protocol specific errors comprise simulated errors in an Internet Small Computer System Interface (iSCSI) protocol.

8. The apparatus according to claim 4, wherein said protocol specific errors simulate errors that are remotely generated.

9. The apparatus according to claim 1, wherein said initiator circuit includes a software module configured to generate said errors in said file prior to generation of said testing sequences.

10. The apparatus according to claim 9, wherein said software module is updatable.

11. The apparatus according to claim 1, wherein said file is generated in a virtual directory structure compatible with a specific operating system.

12. The apparatus according to claim 11, wherein said specific operating system comprises a Linux operating system.

13. An apparatus comprising:
means for communicating with a network;
means for generating a plurality of testing sequences from a plurality of values stored in a file;
means for creating one or more errors in said testing sequences by altering said file;
means for transmitting said file including said testing sequences on said network;
means for receiving said file including testing sequences from said network;
means for generating a plurality of responses to said testing sequences;
means for transmitting said responses on said network to said means for communicating with said network; and
means for verifying that said means for receiving said testing sequences properly responded to said errors in said testing sequences.

14. A method for testing via a network comprising the steps of:
(A) communicating with said network with an initiator circuit;
(B) generating a plurality of testing sequences from a plurality of values stored in a file within said initiator circuit;
(C) creating one or more errors in said testing sequences by altering said file;
(D) transmitting said file including said testing sequences on said network;
(E) receiving said file including testing sequences from said network of a target circuit;
(F) generating a plurality of responses to said testing sequences;
(G) transmitting said responses on said network to said initiator circuit; and
(H) verifying that said method properly responded to said errors in said testing sequences by said initiator circuit.

15. The method according to claim 14, wherein said errors introduced in said testing sequences simulate protocol specific errors.

16. The method according to claim 14, wherein said errors are included in an initial generation of said testing sequences.

17. The method according to claim 14, further comprising the step of:
executing a software module in said initiator circuit to generate said errors in said file prior to generation of said testing sequences.

18. The method according to claim 14, wherein said testing sequences are generated in a first state, the method further comprising the step of:
generating error-free sequences from said values with said initiator circuit in a second state.

19. The method according to claim 18, further comprising the steps of:
generating a plurality of response sequences in response to said error-free sequences with said target circuit; and
creating one or more response errors in said response sequences.

20. The method according to claim 19, further comprising the steps of:
transmitting said response sequences to said initiator circuit; and
verifying if said initiator circuit properly handles said response errors in said response sequences.

* * * * *